United States Patent [19]

Tank et al.

[11] Patent Number: 4,498,913

[45] Date of Patent: Feb. 12, 1985

[54] APPARATUS FOR FILTERING AIR FOR A POWDER SPRAY BOOTH

[75] Inventors: Gene F. Tank, Amherst; Samuel O. Dawson, Avon Lake, both of Ohio; Phillip R. Barnett, Mishawaka, Ind.

[73] Assignee: Nordson Corporation, Amherst, Ohio

[21] Appl. No.: 539,521

[22] Filed: Oct. 6, 1983

[51] Int. Cl.³ ........................ B01D 46/00; B05B 15/04

[52] U.S. Cl. ........................................ 55/356; 55/422; 55/472; 55/481; 55/DIG. 46; 98/115.2; 118/DIG. 7

[58] Field of Search ................. 55/356, 358, 422, 481, 55/472, 502, 529, DIG. 46; 98/115 SB; 118/326, 603, 610, DIG. 7; 220/345; 312/122, 201, 333

[56] References Cited

U.S. PATENT DOCUMENTS 3,719,030 3/1973 Blankemeyer et al. ............... 55/356
3,849,092 11/1974 Bakke et al. .......................... 55/302
3,944,404 3/1976 Andrásfalvy .......................... 55/302
4,277,260 7/1981 Browning ............................. 55/273
4,378,728 4/1983 Berkman .............................. 55/356
4,401,445 8/1983 Browning ............................. 55/356

FOREIGN PATENT DOCUMENTS 2835474 2/1980 Fed. Rep. of Germany .
2369878 11/1976 France .
1315671 5/1973 United Kingdom .

*Primary Examiner*—David L. Lacey
*Attorney, Agent, or Firm*—Wood, Herron & Evans

[57] ABSTRACT

Apparatus for filtering air for a powder spray booth. A fan plenum is fixed in an elevated position and has a lower edge lying in an inclined plane. The filter module has an upper edge lying in an inclined plane and has an elastomeric compressible gasket around its edge. The filter module is mounted on wheels so that it can be rolled into edge-to-edge engagement with the plenum and clamped in that position.

2 Claims, 1 Drawing Figure

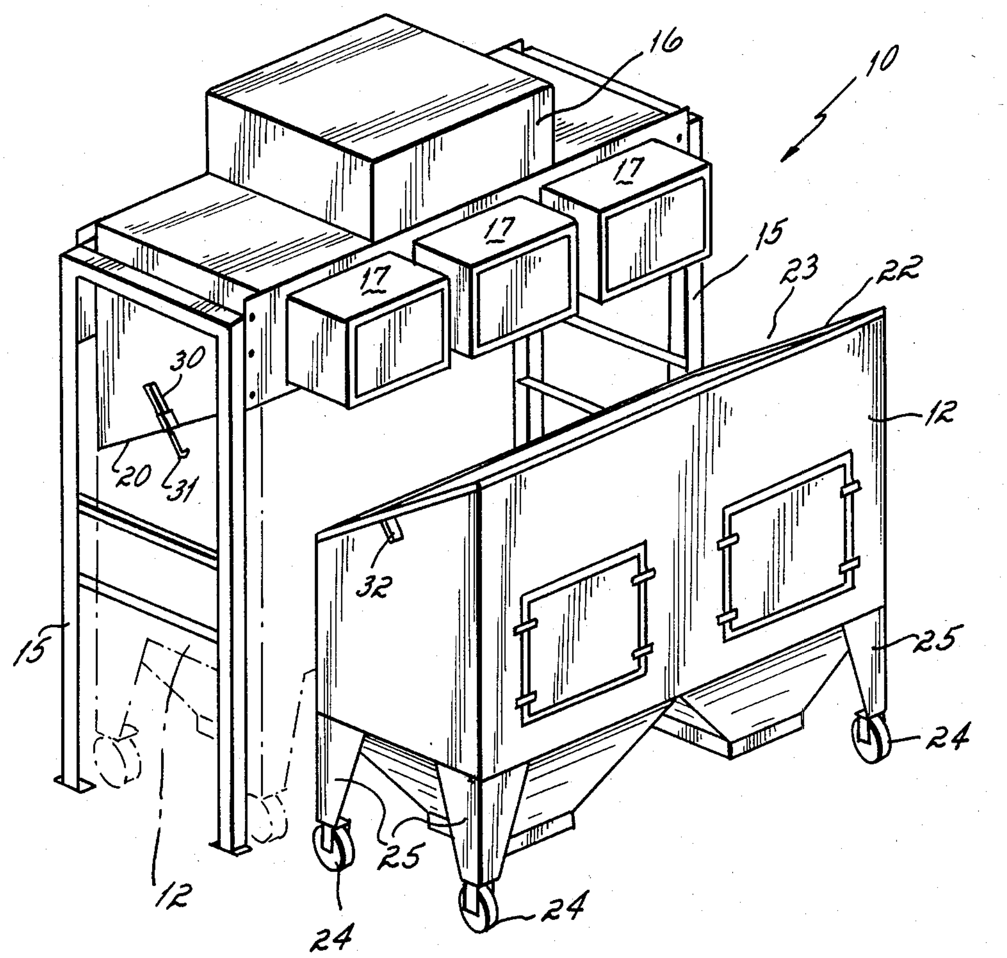
16
10
17
17
17
15
23
22
30
12
20
31
32
25
15
24
25
12
24
24

APPARATUS FOR FILTERING AIR FOR A POWDER SPRAY BOOTH

This invention relates to apparatus for use in association with a powder spray booth, and more particularly, to apparatus for filtering air, the apparatus utilizing a removable filter module.

Powder spray booths are well known in the art. One such spray booth is disclosed in U.S. Pat. No. 4,378,728.

As disclosed in that patent, products to be painted are conveyed through a booth. An electrostatic spray gun receives paint particles in powdered form from a feed hopper and dispenses them into the spray booth against the product to be painted. Not all of the powdered particles adhere to the product. Those not adhering are entrained in air flowing through the spray booth to a filter. In the filter, the particles are trapped by the filter medium. From time to time the particles are vibrated off the medium and fall into a fluidized bed hopper at the bottom of the filter. Hoses are provided for conveying the particles back to the feed hopper.

As further disclosed in the patent, provision has been made for interchangeable filter modules. The filter module is a unit which contains the filter medium, the fluidized bed below the filter medium and provision for hose connections. The filter module is mounted on wheels so that it can be rolled into position adjacent an air plenum having a blower which creates the necessary air flow. In practice it is necessary to provide a lifting mechanism for a portion of the fan plenum so that it can be lifted when the filter module is being rolled into place or removed. After the filter module is in place, the plenum is lowered into position and clamped into sealing engagement with the filter module. A flexible duct must be provided to interconnect the liftable portion of the plenum and the housing which contains the blower. The lifting mechanism itself is complicated and expensive.

An objective of the invention has been to provide a filter apparatus having a replaceable filter module which avoids the complexity and cost of the apparatus described above.

The foregoing objective of the invention is attained by providing a plenum having a lower edge lying in an inclined plane and a filter module having an upper edge lying in substantially the same plane so that the filter module can be rolled into edge-to-edge engagement with the plenum without the requirement of lifting of any portion of the plenum. Preferably, a compressible elastomeric gasket is mounted on the upper edge of the filter module so that it can be sandwiched between the edges of the plenum and module, respectively. Clamping mechanism is provided to draw the filter module with its compressible gasket tightly against the lower edge of the plenum.

The several features and objectives of the present invention will become more readily apparent from the following detailed description taken in conjunction with the drawing which is a diagrammatic perspective view of a filter utilizing the present invention.

The filter of the present invention is shown at 10 and consists primarily of a fan or blower plenum 11 and a filter module 12. The plenum 11 is supported above a floor 14 by vertical supports 15 mounted on each side of the plenum. The plenum is a sheet metal housing which contains a blower, not shown, in the upper portion 16. Final filters are mounted in the housings shown at 17. The plenum has a lower edge 20 which lies in a plane inclined at an angle of about 30° to a horizontal plane or to the floor 14.

The filter module 12 has an upper edge 22 which lies in a plane also inclined to horizontal at an angle of approximately 30°. A compressible elastomeric gasket 23 is mounted on the edge 22. The filter module is supported on wheels 24 mounted at the lower ends of legs 25 which enable the module to be rolled into position with the edge 22 in engagement with the edge 20 of the plenum as shown in phantom lines 12'.

The structure within the filter module is conventional and of the type disclosed in U.S. Pat. No. 4,378,728.

A clamp 30 is mounted on each side of the plenum, the clamp having a vertically-movable hook 31. A lug 32 is mounted on each side of the filter module in a position for engagement by the hook 31 when the filter module is positioned under the plenum. By actuating the clamp, the hook 31 pulls upwardly on the lug 32, thereby tightly compressing the elastomeric gasket against the edge 20 of the plenum so as to provide an airtight seal between the plenum and the filter module.

In operation, when a color change is to be made, the clamps are loosened from the filter module which is in place with respect to the plenum. The filter module is thereafter rolled away from the plenum and a different filter module associated with a different color of powder is rolled into position under the plenum. The clamps are actuated to squeeze the elastomeric gasket 23 between the edges 20 and 22 of the plenum and module, respectively. When in place and hose connections made to the feed hopper and the like, the powder booth is ready for operation to apply the new color to the product. It will be observed that because of the inclined mating edges between the plenum and the module, no mechanism is required to raise and lower the plenum to seat it in position with respect to the filter module.

Having described our invention, we claim:

1. Apparatus for filtering air for a powder spray booth comprising, a fan plenum, vertical supports mounted on each side of said fan plenum to support said plenum above a floor, said plenum having a lower edge which lies in a plane inclined at an angle to a horizontal plane, a filter module, wheels mounted on said filter module to support it on the floor, said filter module having an upper edge lying in said inclined plane, said edges being engageable when said filter module is rolled into position under said plenum.

2. Apparatus as in claim 1, further comprising, a compressible gasket mounted between the edges of said plenum and module, respectively, and means for clamping said filter module against said plenum with said gasket compressed between respective edges.

* * * * *